United States Patent
Bloms et al.

(10) Patent No.: US 9,002,582 B2
(45) Date of Patent: Apr. 7, 2015

(54) MULTI-SONIC SENSOR

(71) Applicant: Sauer-Danfoss Inc., Ames, IA (US)

(72) Inventors: Kevin W. Bloms, Minnetonka, MN (US); Richard J. Wolf, Delano, MN (US); Michael Olson, Brooklyn Park, MN (US); Scott Lee Kessler, Brooklyn Park, MN (US); Jack Zeng, Eden Prairie, MN (US)

(73) Assignee: Sauer-Danfoss Inc., Ames, IA (US)

(*) Notice: Subject to any disclaimer, the term of this patent is extended or adjusted under 35 U.S.C. 154(b) by 0 days.

(21) Appl. No.: 14/013,496

(22) Filed: Aug. 29, 2013

(65) Prior Publication Data
US 2015/0066297 A1 Mar. 5, 2015

(51) Int. Cl.
*B62D 6/00* (2006.01)
*H04B 17/00* (2006.01)

(52) U.S. Cl.
CPC .......... *H04B 17/0062* (2013.01); *B62D 6/002* (2013.01)

(58) Field of Classification Search
None
See application file for complete search history.

(56) References Cited

U.S. PATENT DOCUMENTS

| | | | | |
|---|---|---|---|---|
| 4,557,447 | A * | 12/1985 | Combe | 248/74.1 |
| 4,961,173 | A * | 10/1990 | Sehr et al. | 367/96 |
| 5,010,455 | A * | 4/1991 | Luallin et al. | 362/519 |
| 6,027,282 | A * | 2/2000 | Horn | 404/75 |
| 6,292,095 | B1 * | 9/2001 | Fuller et al. | 340/442 |
| 6,916,070 | B2 * | 7/2005 | Sehr | 299/1.5 |
| 7,044,680 | B2 * | 5/2006 | Godbersen et al. | 404/75 |
| 8,469,630 | B2 * | 6/2013 | Olson et al. | 404/84.05 |
| 8,646,167 | B2 * | 2/2014 | Zeng | 29/592.1 |
| 8,682,622 | B1 * | 3/2014 | Brenner et al. | 703/2 |
| 2008/0147356 | A1 * | 6/2008 | Leard et al. | 702/183 |
| 2012/0236142 | A1 * | 9/2012 | Enix | 348/118 |
| 2013/0103231 | A1 * | 4/2013 | Zeng et al. | 701/2 |
| 2013/0124010 | A1 * | 5/2013 | Olson et al. | 701/2 |

OTHER PUBLICATIONS

Voegele Webpage, Grade and Slope Control: One Sensor for Two Applications, Voegele, located at http://www.voegele.info/en/technologien/nivelliertechnik/ein_sensor_fuer_zwei_anwendungen.html, Published at least as early as Dec. 29, 2012, per Wayback Machine Internet Achive.*

* cited by examiner

*Primary Examiner* — John R Olszewski
*Assistant Examiner* — James M McPherson
(74) *Attorney, Agent, or Firm* — Zarley Law Firm, P.L.C.

(57) ABSTRACT

A multi-sonic sensor having a housing, a removable clamp member, a sonic sensor array, and a magnetically connected temperature bail that operates in three modes—a running average, an outlier average, and a string line steering mode.

16 Claims, 4 Drawing Sheets

MULTI-SONIC SENSOR

BACKGROUND OF THE INVENTION

This invention is directed to a multi-sonic sensor and more particularly a multi-sonic sensor used for high precision steering sensing combined with precision elevation sensing for machine control.

Current sonic sensors which measure elevation with multiple sensing elements for machine control systems have very coarse steering measurement capability when using a string line reference. The steering accuracy is usually in the low centimeters or even in the low inches which is not adequate for automating the machine control steering. This accuracy is typically only good enough to provide a visual indication to a driver of the direction a vehicle should be manually steered.

In addition, maintaining a constant elevation while measuring steering on a string line is problematic when the position changes and measuring elevation while finding a sufficient steering reference for machine control is also problematic. Further, a problem with current sensors is removing minor surface flaws from the elevation measurement.

With respect to temperature compensation, current schemes measure temperature once and then sample each individual sonic sensor which compensates the speed of the sonic pulses per the temperature variation from the single temperature measurement taken at the beginning of cycle. The separation in time between the temperature measurement and the subsequent sonic sensor samples allows for quick temperature changes which creates lagging temperature compensation of the last sampled sonic sensor and are increasingly more susceptible to temperature drift compensation error.

Temperature bails, which compensate for the change in temperature, are not calibrated for differences between sensors in a multi-sonic sensor. The bails also can be easily damaged or lost and can also cause damage to the sensor when the bail is damaged.

Finally, multi-sonic sensors typically are removed from a machine at the end of a work day to guard against theft and/or malicious acts that cause damage to the sensor. As such, sensors are securely attached to a machine which does not allow for quick removal, extending the work day for the time needed to remove the sensor. Thus, a need exists in the art for a multi-sonic sensor that addresses these deficiencies.

Therefore, an objective of the present invention is to provide a multi-sonic sensor which more accurately measures elevation and steering.

A further objective of the invention is to provide a multi-sonic sensor that more accurately measures temperature compensation.

A still further objective of the present invention is to provide a multi-sonic sensor that is capable of quick removal.

These and other objectives will be apparent to one of ordinary skill in the art based upon the following written description, drawings, and claims.

SUMMARY OF THE INVENTION

A multi-sonic sensor having a housing with a top, sides and a bottom. On the top of the housing is a removable clamp member and in longitudinal alignment along the bottom of the housing is an array of sonic sensors. Also, on the bottom of the housing is a groove that receives a temperature bail for storage during non-use. During use, the temperature bail is magnetically attached to the housing and extends longitudinally in space parallel alignment with the array of sonic sensors.

The multi-sonic sensor, which is connected to a controller, is capable of operating in at least three modes. The first mode uses a running average of measurements taken by the sensors in the array. The second mode, known as an outlier average, utilizes the three sensor measurements closest to a specified predetermined set point and excludes the three farthest or outliers from the running average. The third mode, known as a string line steering mode calculates a string line position using a weighted average. In this mode, six sensors are orthogonal to the direction of machine travel which is parallel to the string line reference.

DETAILED DESCRIPTION OF THE PREFERRED EMBODIMENTS

Figure 1:
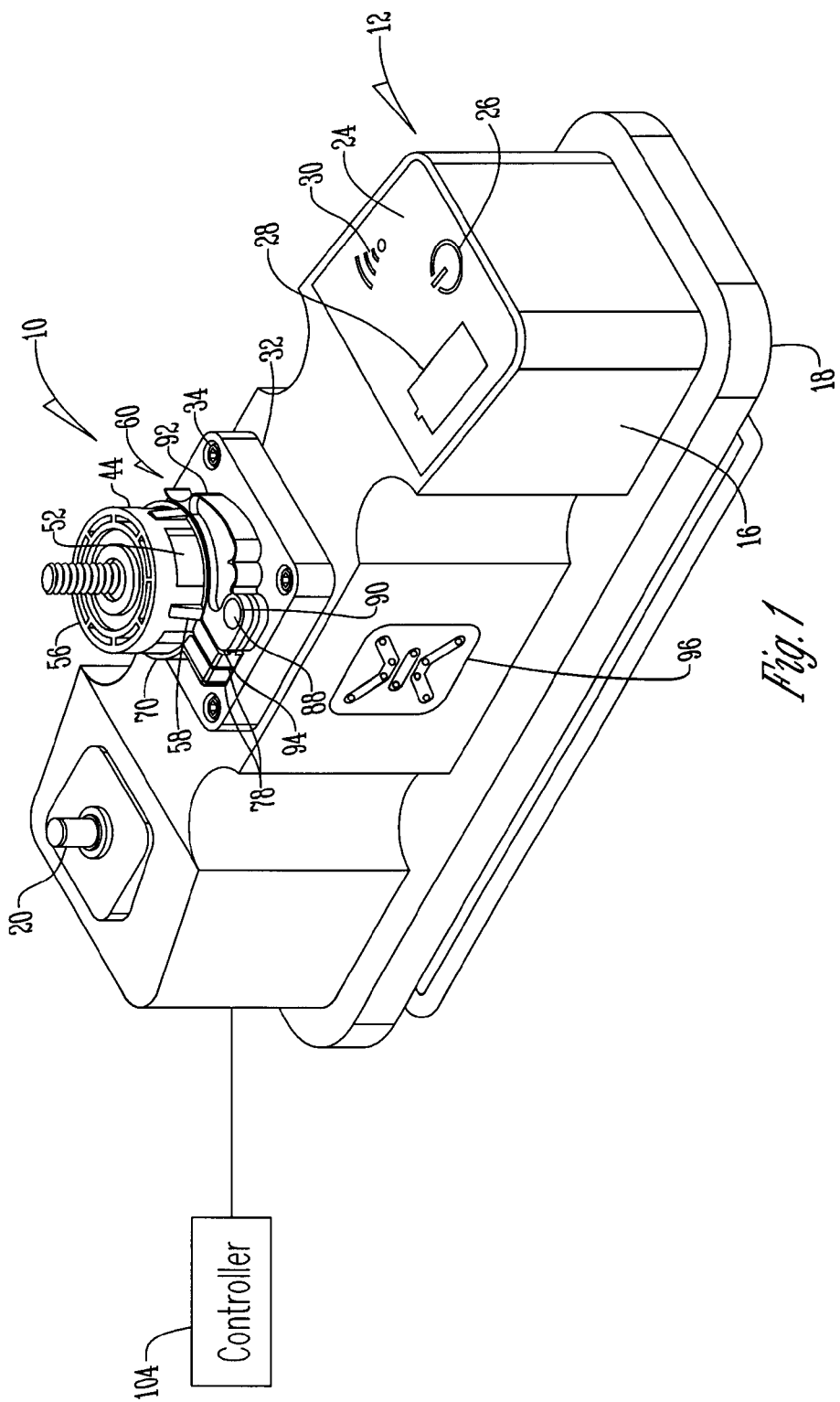
FIG. 1 is a perspective view of a multi-sonic sensor.
Figure 2:
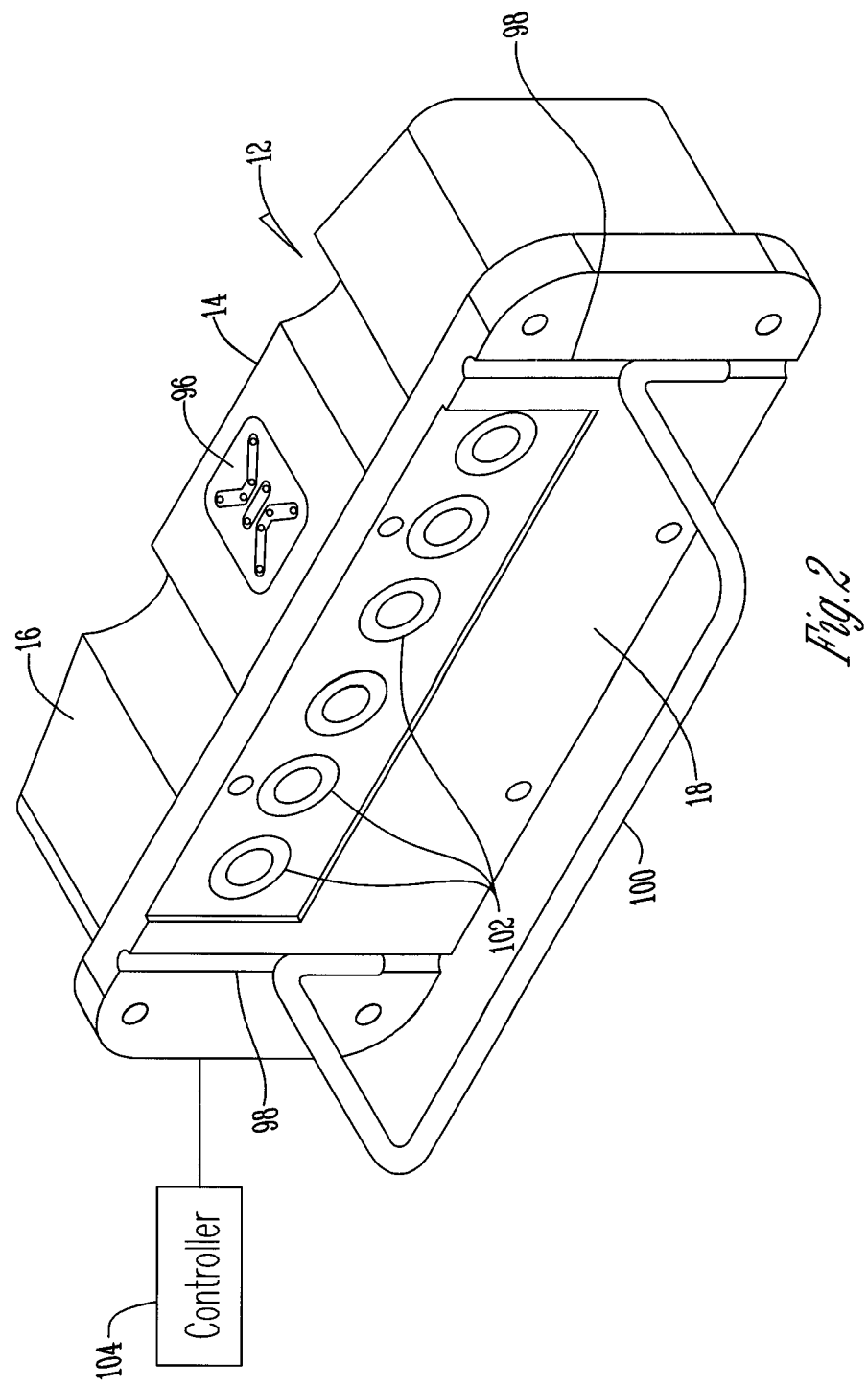
FIG. 2 is a perspective view of the side and bottom of a multi-sonic sensor.
Figure 3:
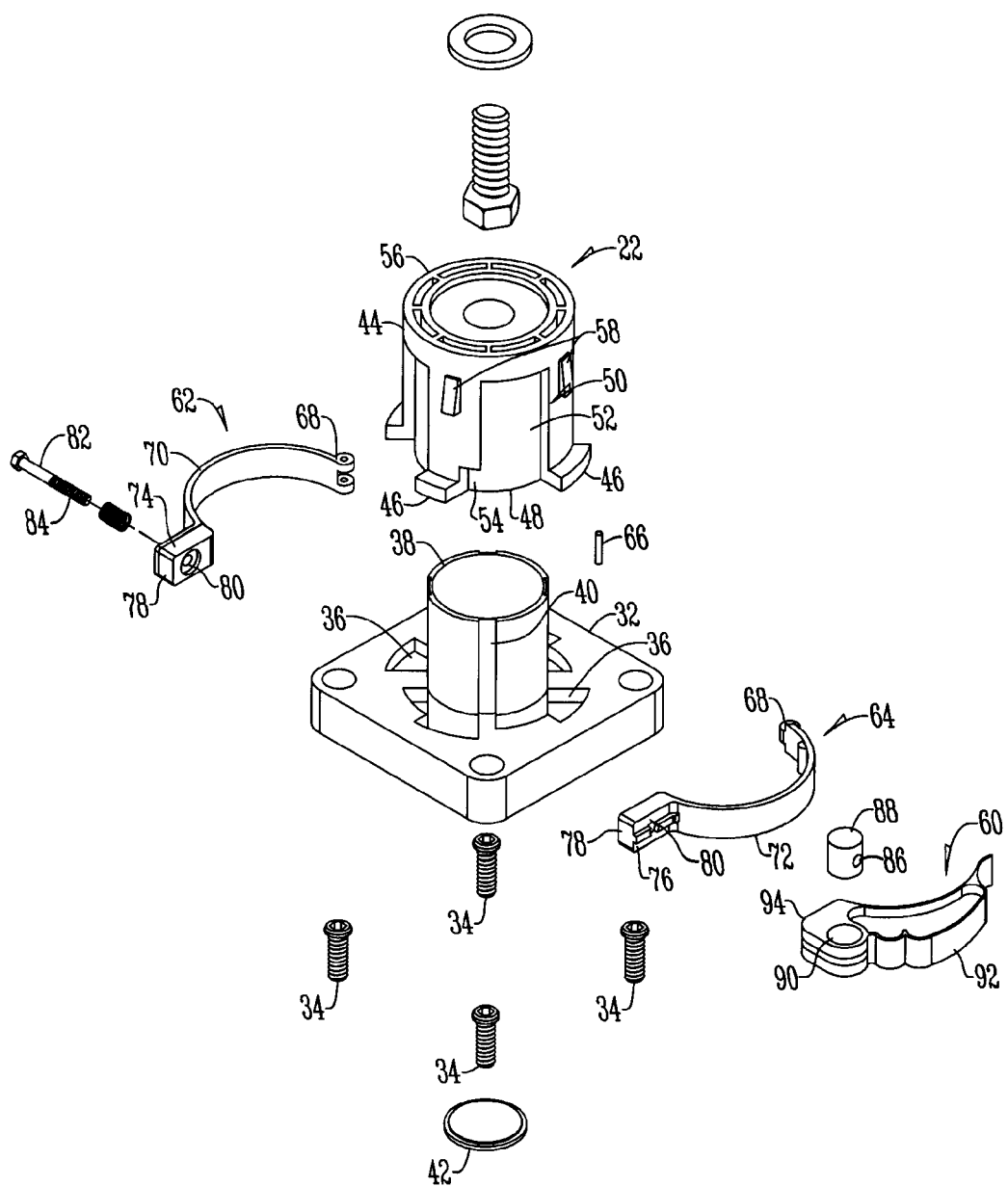
FIG. 3 is an exploded view of a removable mounting clamp for a multi-sonic sensor.
Figure 4:
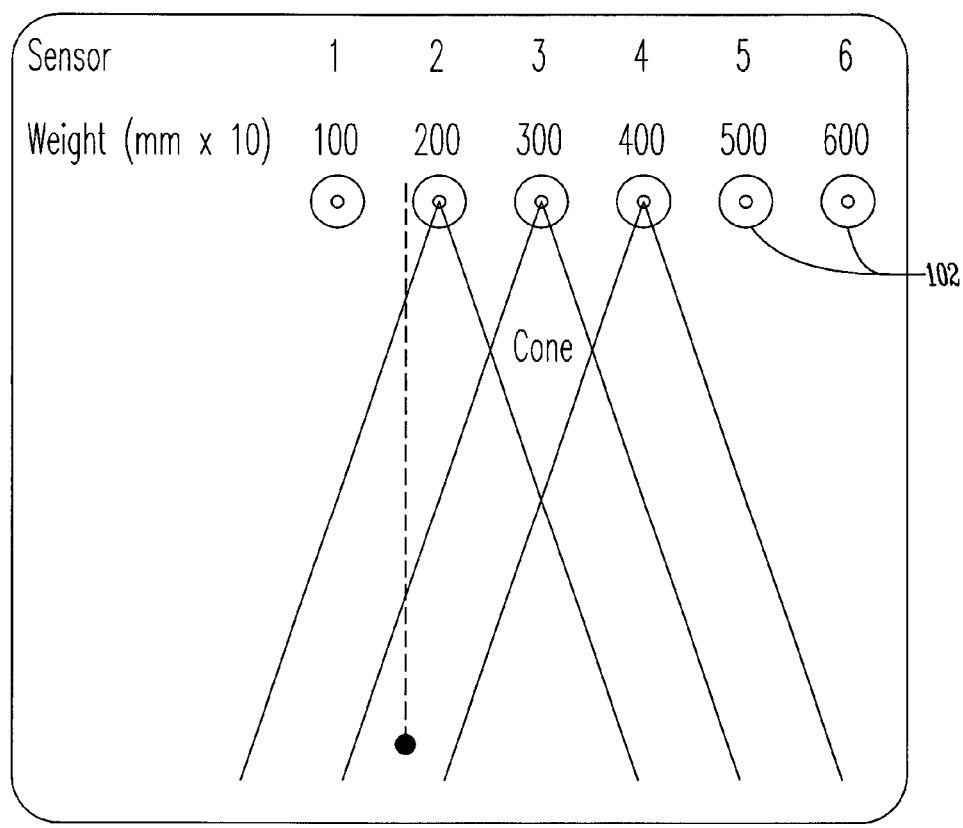
FIG. 4 is a diagram of a string line mode of operation for a multi-sonic sensor.

Referring to the Figures, a multi-sonic sensor 10 has a housing 12 having a top 14, sides 16, and a bottom 18. On the top 14 is a charging port 20, a mounting clamp 22, and a control panel 24. Alternatively, the charging port 20 is a CAN line and source address configuration pin. The control panel 24 includes an on/off button 26, a battery gauge 28, and a wireless indicator 30.

The mounting clamp 22 has a mounting plate 32 that is secured to the housing 12 by a plurality of screws 34. The plate 32 has a plurality of locking grooves 36 that surround a mounting tube 38 that is centrally located on the plate 32. The mounting tube 38 has a plurality of protuberances 40 that extend inwardly from the outer surface of the tube 38 and extend the length of the tube 38. Secured under the removable mount 44 is an RFID tag disk 42 on the bottom edge 48.

A removable mount member 44 fits onto the mounting tube 38. The mounting member 44 has a plurality of feet 46 extending outwardly from the bottom edge 48 of the mounting member 44 and are formed to be rotatably received within the locking grooves 36 of the mounting plate 32. The mount member 44 also has a plurality of mounting grooves 50 that are positioned to receive the protuberances 40 of the mounting tube 38 and have a vertical section 52 and a horizontal section 54 of sufficient width and length to permit limited rotation of the mount member 44 within the locking grooves 36. Generally midway between the top edge 56 and the bottom edge 48 of the mount member 44 are a plurality of stops 58 that extend outwardly from the mount member 44.

Positioned around the mount member 44 is a releasable clamp member 60 that fits between the mounting plate 32 and the stops 58. The clamp member 60 has a pair of clamp arms 62 and 64 that are pivotally connected about a pivot pin 66 at a first end 68. The arms 62 and 64 have an arcuate section 70 and 72 that extend from the first end 68 and receive the mount member 44 and then terminate in a releasable connecting section 74 and 76 at a second end 78. The connecting sections have aligned apertures 80 that receive a spring loaded screw 82. The spring loaded screw 82 has a threaded end 84 that is received in a threaded opening 86 on a pivot pin 88. The pivot pin 88 is received within apertures 90 of a cam arm 92 that is formed to mate with cam arm 64 and has cam surfaces 94 that engage the connecting section 76 of cam arm 64. The mounting clamp 22 permits a rapid and quick connection and disconnect of sensor 10.

On opposite sides 16 of the housing 12, below the mounting clamp 22 and between the charging port 20 and the control panel 24, are grade indicators 96. On the bottom 18 is a groove 98 that selectively receives a temperature bail 100 in both a stowed and operating position. The temperature bail 100 magnetically locks in place when in use which allows for easy removal particularly in the presence of a physical obstruction that could bend or break the bail 100. As such, the bail 100 will detach from housing 12 when the bail 100 encounters an object in any direction. Also, the computer calculates a linear regression analysis of the sensor's individual data to determine the slope between the sensors and the target. Extending along the length of the bottom 18 of the housing 12, is an array of sonic sensors 102. Preferably there are six sonic sensors 102 that are evenly spaced from one another. The sensors 102 can detect the presence of the bail 100 to prevent that temperature compensation and accuracy are not compromised.

In operation, the sensors 102 are alternately sampled, preferably every 10 ms. Each sensor takes two measurements—one for temperature compensation and one for target measurement. The single cycle dual sample approach is enabled by the temperature bail 100 extending the length of the sensor array 102 which makes the bail 100 accessible to each individual sensor. This arrangement provides for faster temperature compensation to respond to fluctuations that are caused by wind gusts and vehicle exhaust, faster sensor response time since no separate breaks in measurements are needed to account for temperature compensation readings, and the entire circuit for each individual sonic sensor 102 is calibrated. Further, the spacing between sensors 102 is selected to optimize both elevation accuracy and steering capabilities of various multi-sonic sensors 102.

Preferably, the sensors 102 are configured for three operating modes. In the first mode the sensors 102 are positioned generally parallel to the direction of machine travel. In this mode, each sensor 102 takes a temperature compensated measurement which is sent to a controller 104 and combined to determine a running average height of all sensors 102. This mode provides for a smooth step transition for ideal targets, but is susceptible to target abnormalities which the machine control system may not want to react to.

In a second mode, a survey set point is given for each sensor 102 and the set point is stored by the controller 104. Again, each sensor 102 takes a temperature compensated measurement and are sent to the controller 104. The controller then determines the difference between the set point and the measurement and the three with the greatest deviation are discarded when determining the running average. This mode provides filtering of target abnormalities and faster yet rougher response to a step transition.

In a third mode of operation, the string line height and string line position are measured with respect to the placement between the sonic sensors 102. To operate in this mode, the sensor 10 is rotated 90 degrees in relation to the mount member 44. The string line height is measured by triangulating the distance using two sensor measurements which allows for better accuracy due to trigonometric errors inherent when the height measurement from a single sensor having the shortest distance is used. The triangulating of multiple sensors provides constant elevation measurements as a target shifts from directly under one of the sensors to between adjacent sensors.

The string line position is measured, in one example, using six sensors spaced 3 cm apart as follows:
  (i) taking and storing sonic echo time stamps in an array and calculating with a computer the average distance of each sensor
  (ii) comparing with the computer each sensor's calculated average distance with a predetermined desired distance to determine if the average distance is within a specified range for string line operation
  (iii) determining which sensor detects the shortest distance and whether other sensors are within a specified distance of the sensor having the shortest distance
  (iv) assigning a sensor position value (e.g. Sen1=100, Sen2=200, Sen3=300, etc.) to the sensor with the shortest distance and the sensors within a specific distance
  (v) determining a string line position by calculating the sum of the product of the individual sensor's sensor position value and the number of sonic returns divided by the total sonic returns of the relevant sonic sensors. The more distant sensors will not always receive a sonic return for each measurement. As an example, Sen1, Sen2 and Sen3 return 6, 8, and 5 respectively:

$$\frac{((100 X 6) + (200 X 8) + (300 X 5))}{(6 + 8 + 5)}$$
$$= \frac{600 + 1600 + 1500}{19}$$
$$= 194.7$$

Which puts the string line position just to the left of sensor 2.
  (vi) calculate a running average of the last 8 analog positions to provide further smoothing of the analog position calculation
  (vii) compare the running average analog position with eleven predetermined specified ranges to determine which range the analog position falls within
  (viii) assigning a string line position value based upon the determined range the analog position falls within.

Similar to the string line position for use as a reference for steering and elevation machine control, the top of a curb may be used for an elevation reference and the edge of a curb for a steering reference for machine control.

What is claimed is:

1. A multi-sonic sensor, comprising:
   a housing having a top, sides, and a bottom;
   a mounting clamp connected to the top of the housing;
   an array of sonic sensors aligned longitudinally along the bottom surface of the housing; and
   a temperature bail magnetically connected to the bottom surface of the housing and extending longitudinally in spaced relation to the array of sensors.

2. The sensor of claim 1 wherein the mounting clamp includes a mounting plate secured to the top of the housing wherein the mounting plate has a plurality of locking grooves that surround a centrally located mounting tube, a mount member that fits onto the mount tube and has a plurality of feet that extend outwardly from a bottom edge of the mount member and are rotatably received within the locking grooves of the mounting plate, and a releasable clamp member that fits around the mount member.

3. The sensor of claim 1 wherein the array of sonic sensors includes six sonic sensors.

4. The sensor of claim 1 wherein the bottom of the housing has a groove formed to receive the temperature bail for storage.

5. The sensor of claim 1 wherein each sensor in the array of sonic sensors takes a temperature compensated measurement that is sent to a controller wherein the controller calculates a running average height of all sensors.

6. The sensor of claim 1 wherein each sensor in the array of sonic sensors takes a temperature compensated measurement that is sent to a controller wherein the controller compares the measurements with stored predetermined set points and calculates a running average height of three sensors that have a measurement closest to the stored predetermined set point.

7. The sensor of claim 1 wherein a controller calculates an average distance for each sensor in the array of sensors, determines whether each sensor is within a specified range, and calculates a string line position by assigning a sensor position value to each sensor within the predetermined specified range, multiplying the sensor position value by a sonic return for each sensor, adding the product of the multiplied sensor returns, and dividing by the sum of the sonic return for each sensor.

8. The sensor of claim 1 wherein a controller calculates a string line height by triangulating a distance using two sensor measurements.

9. The sensor of claim 7 wherein the computer calculates a running average based upon the last eight calculated string line positions.

10. The sensor of claim 7 wherein the running average position is compared by the controller with a set of predetermined specified ranges.

11. The sensor of claim 1 wherein the sensor senses a top of a curb for an elevation reference and the sensor sense an edge of a curb for a steering reference.

12. The sensor of claim 1 wherein when the bail encounters an object from any direction it detaches from the housing.

13. The sensor of claim 1 wherein the temperature bail extends the length of the array of sensors.

14. The sensor of claim 1 wherein the sensors detect the presence of the temperature bail.

15. The sensor of claim 2 wherein a RFID tag disk is secured under the mounting member.

16. The sensor of claim 4 wherein the groove selectively receives the temperature bail in both a stowed and operating position.

* * * * *